United States Patent
Omura et al.

(10) Patent No.: US 10,044,894 B2
(45) Date of Patent: Aug. 7, 2018

(54) IMAGE FORMING APPARATUS HAVING TIMER FUNCTION RELATED TO POWER CONSUMPTION MODES

(71) Applicant: CANON KABUSHIKI KAISHA, Tokyo (JP)

(72) Inventors: Naoka Omura, Matsudo (JP); Satoru Yamamoto, Noda (JP); Toshiyuki Miyake, Abiko (JP); Katsuya Nakama, Nagareyama (JP); Koji Yumoto, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/488,607

(22) Filed: Apr. 17, 2017

(65) Prior Publication Data

US 2017/0310842 A1    Oct. 26, 2017

(30) Foreign Application Priority Data

Apr. 20, 2016 (JP) ................................. 2016-084412

(51) Int. Cl.
| | |
|---|---|
| *G06F 1/00* | (2006.01) |
| *G06F 15/00* | (2006.01) |
| *G06K 15/00* | (2006.01) |
| *H04N 1/00* | (2006.01) |

(52) U.S. Cl.
CPC ..... *H04N 1/00933* (2013.01); *H04N 1/00411* (2013.01); *H04N 1/00602* (2013.01); *H04N 1/00891* (2013.01); *H04N 1/00896* (2013.01); *H04N 2201/0094* (2013.01)

(58) Field of Classification Search
CPC ........... H04N 1/00933; H04N 1/00411; H04N 1/00602; H04N 1/00891; H04N 1/00896; H04N 2201/0094

USPC ................................. 358/1.14, 1.13, 1.15, 1.1
See application file for complete search history.

(56) References Cited

U.S. PATENT DOCUMENTS

| | | | |
|---|---|---|---|
| 2006/0103887 A1* | 5/2006 | Enomoto | H04N 1/00132 358/296 |
| 2007/0260337 A1* | 11/2007 | Sugiyama | G06F 1/32 700/40 |
| 2014/0153013 A1* | 6/2014 | Imamura | H04N 1/00037 358/1.12 |

FOREIGN PATENT DOCUMENTS

JP        2006082258 A    3/2006

* cited by examiner

*Primary Examiner* — Douglas Tran
(74) *Attorney, Agent, or Firm* — Rossi, Kimms & McDowell LLP

(57) ABSTRACT

An image forming apparatus which performs an adjustment operation at appropriate timing. Whether to execute a first or a second adjustment processes is controlled based on the number of sheets on which images are formed. A first adjustment operation is executed in a case where the number of sheets has reached a first number since a previous first adjustment process was executed. A second adjustment operation is executed in a case where the number of sheets has reached a second number since a previous second adjustment process was executed. The first adjustment operation is executed in a case where the number of sheets has reached the first number prior to a designated time by a predetermined period. The second adjustment operation is skipped in a case where the number of sheets has reached the second number prior to the designated time by the predetermined period.

17 Claims, 11 Drawing Sheets

*FIG. 5*

| ID(n) | ADJUSTMENT TYPE | THRESHOLD VALUE $X_n$ [SHEETS] |
|---|---|---|
| 1 | WIRE CLEANING | 2500 |
| 2 | POTENTIAL CONTROL | 5000 |
| ⋮ | ⋮ | ⋮ |

501

IMAGE FORMING APPARATUS HAVING TIMER FUNCTION RELATED TO POWER CONSUMPTION MODES

BACKGROUND OF THE INVENTION

Field of the Invention

The present invention relates to an image forming apparatus.

Description of the Related Art

Conventionally, in image forming apparatuses such as printers and digital multifunction peripherals, various types of adjustment operations such as image density correction are performed. For example, depending on printing environments such as temperature and humidity, a color tone or gradation of a printed color image may change, or misregistration of colors may occur. Thus, the conventional image forming apparatuses adjust an image by forming a predetermined measurement image, correcting density based on density information obtained through measurement of the measurement image and correcting for misregistration based on misregistration information. Such an adjustment operation is performed at regular time intervals upon turning-on of power to the image forming apparatuses or completion of printing on a predetermined number of sheets. The adjustment operation, however, takes time. When a higher priority is given to obtaining a printing result than to maintaining printing quality, it is preferable that there is no adjustment time. Therefore, there has been proposed a method according to which, when the number of unprinted sheets in a job is smaller than a certain number of sheets, adjustment is postponed and performed after the job is completed (see Japanese Laid-Open Patent Publication (Kokai) No. 2006-82258).

However, printing characteristics change when a certain amount of time has elapsed since the image forming apparatus shifted into a power-saving state or a power-off state after completion of a job, and it is thus preferred that the adjustment operation is performed before image formation immediately after return from the power-saving state or the power-off state. However, when the adjustment operation was performed immediately before shifting into the power-saving state or the power-off state, the same adjustment operation may be performed again immediately after return from the power-saving state or the power-off state. In this case, the adjustment operation performed immediately before shifting into the power-saving state or the power-off state does not make sense. Namely, there is a case of performing the wasteful adjustment operation immediately before the image forming apparatus shifts a mode.

SUMMARY OF THE INVENTION

The present invention provides an image forming apparatus which performs an adjustment operation at appropriate timing.

Accordingly, the present invention provides an image forming apparatus that is controlled based on a first mode and a second mode in which power consumption is lower than that of the first mode and is shifted from the first mode to the second mode according to a designated time, comprising an image forming unit configured to form an image on a sheet, a controller configured to control the image forming unit to execute an adjustment process, and a setting unit configured to set the designated time, wherein, the controller controls whether to execute the adjustment process based on the number of sheets on which the images are formed by the image forming unit, the adjustment process includes a first adjustment process and a second adjustment process, the controller executes a first adjustment operation in a case where the number of sheets on which the images are formed by the image forming unit has reached a first number since a previous first adjustment process was executed last time, the controller executes a second adjustment operation in a case where the number of sheets on which the images are formed by the image forming unit has reached a second number since a previous second adjustment process was executed last time, the controller executes the first adjustment operation in a case where the number of sheets has reached the first number prior to the designated time by a predetermined period, and the controller skips the second adjustment operation in a case where the number of sheets has reached the second number prior to the designated time by the predetermined period.

Further features of the present invention will become apparent from the following description of exemplary embodiments (with reference to the attached drawings).

BRIEF DESCRIPTION OF THE DRAWINGS

FIG. 5 is a view showing an exemplary scheduled operation time table.

DESCRIPTION OF THE EMBODIMENTS

Hereafter, an embodiment of the present invention will be described with reference to the drawings.

Figure 1:
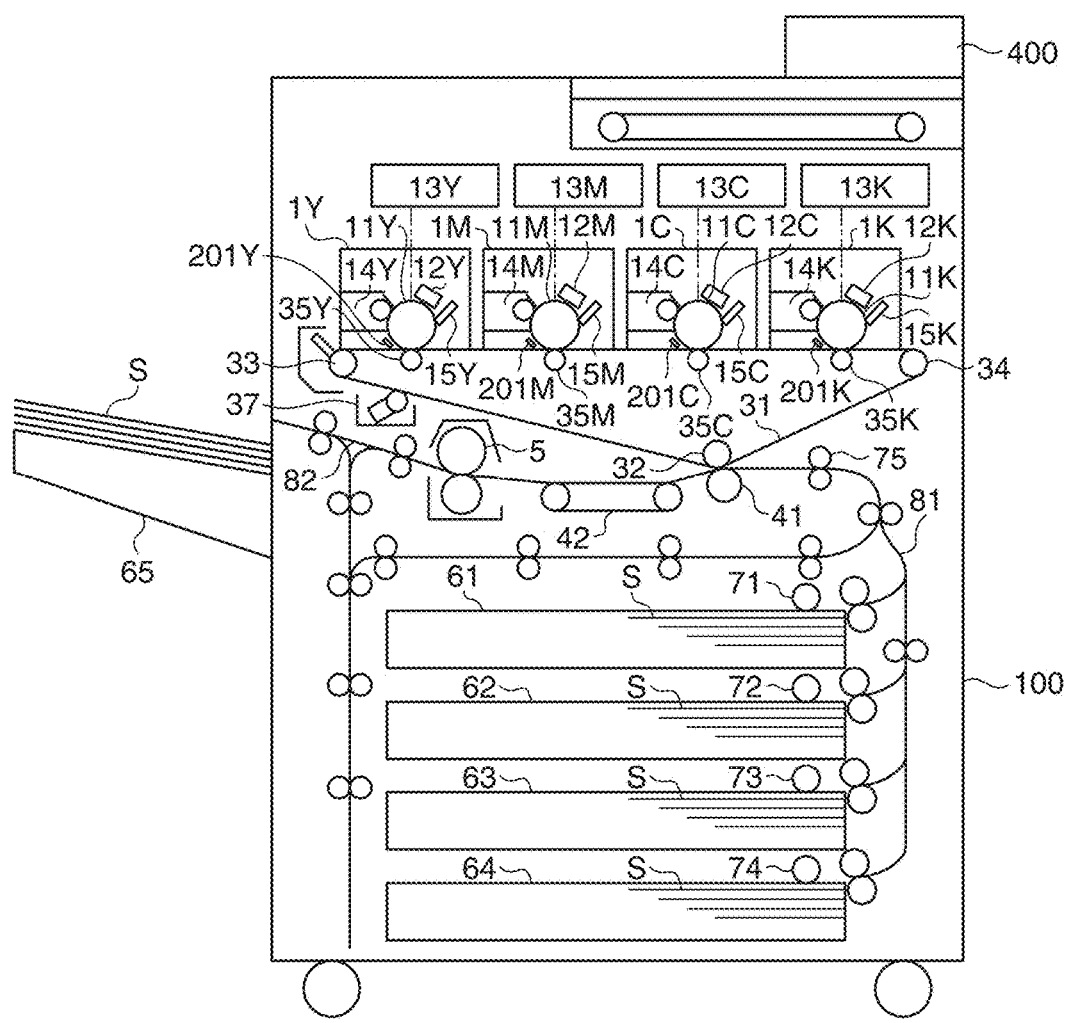
FIG. 1 is a cross-sectional view schematically showing an image forming apparatus.

FIG. 1 is a cross-sectional view schematically showing an image forming apparatus 100. The image forming apparatus 100 is a tandem-type image forming apparatus using an intermediate transfer method, in which image forming units 1 (1Y, 1M, 1C, 1K) are placed in tandem. The image forming apparatus 100 has an operation display device 400. In response to an image signal transmitted from an external apparatus, the image forming apparatus 100 forms a full-color image on a sheet S using an electrophotographic method. The image forming units 1Y, 1M, 1C, and 1K are stations for forming yellow, magenta, cyan, and black images, respectively. The image forming units 1 are comprised of the same component elements, and hence in the following description, when the image forming units are not differentiated from one another, the same reference numerals will be used for the component elements of the image forming units 1, and when they are differentiated from one another, letters Y, M, C, and K are added to ends of the reference numerals.

The image forming units 1 form images of respective colors on their photosensitive drums 11 (11Y, 11M, 11C, 11K) and primarily transfer them to the same position on an intermediate transfer belt 31. The intermediate transfer belt 31 is tightly stretched by a drive roller 33, a tension roller 34, and a transfer opposed roller 32 which is for secondary transfer, and rotatively driven clockwise as viewed in FIG. 1. On an inner peripheral side of the intermediate transfer belt 31, primary transfer rollers 35 (35Y, 35M, 35C, 35K) for primary transfer are placed at locations opposed to the respective photosensitive drums 11.

A charging wire 12 (12Y, 12M, 12C, 12K), an exposure device 13 (13Y, 13M, 13C, 13K), and a developing device 14 (14Y, 14M, 14C, 14K) are placed around each of the photosensitive drums 11. A detecting sensor 201 (201Y, 201M, 201C, 201K) and a cleaning member 15 (15Y, 15M, 15C, 15K) are also placed around each of the photosensitive drums 11. The charging wire 12 uniformly charges a surface of the photosensitive drum 11 with electricity. The exposure device 13 irradiates the photosensitive drum 11 with laser light to form a latent image on the surface of the photosensitive drum 11. The developing device 14 transfers toner to the latent image on the photosensitive drum 11 to form a toner image. The cleaning member 15 removes toner left on the photosensitive drum 11 after primary transfer of the toner image.

On the other hand, sheets S stored in sheet-feeding cassettes 61, 62, 63, and 64 are selectively conveyed to a sheet-feeding conveying path 81 through rotation of sheet-feeding rollers 71, 72, 73, and 74, respectively. In timing with toner images on the intermediate transfer belt 31, registration rollers 75 feed a sheet S to a secondary transfer unit formed by a secondary transfer roller 41 and the transfer opposed roller 32. A thermal fixing device 5 is comprised of upper and lower rollers, and pressure applied by the upper and lower rollers is configured to be variable. There is a halogen lamp (heating member) inside the upper roller, and the amount of heat from the thermal fixing device 5 is adjusted by controlling output from the halogen lamp. The sheet S onto which the toner images have been transferred is conveyed to the thermal fixing device 5 by a conveying belt 42, and the toner images are thermally attached under pressure to the sheet S by the thermal fixing device 5. As a result, the toner images are adhered to a surface of the sheet S to fix a full-color image thereon. After that, the sheet S is fed to a discharged-sheet tray 65 via a sheet-discharging conveying path 82.

Figure 2:
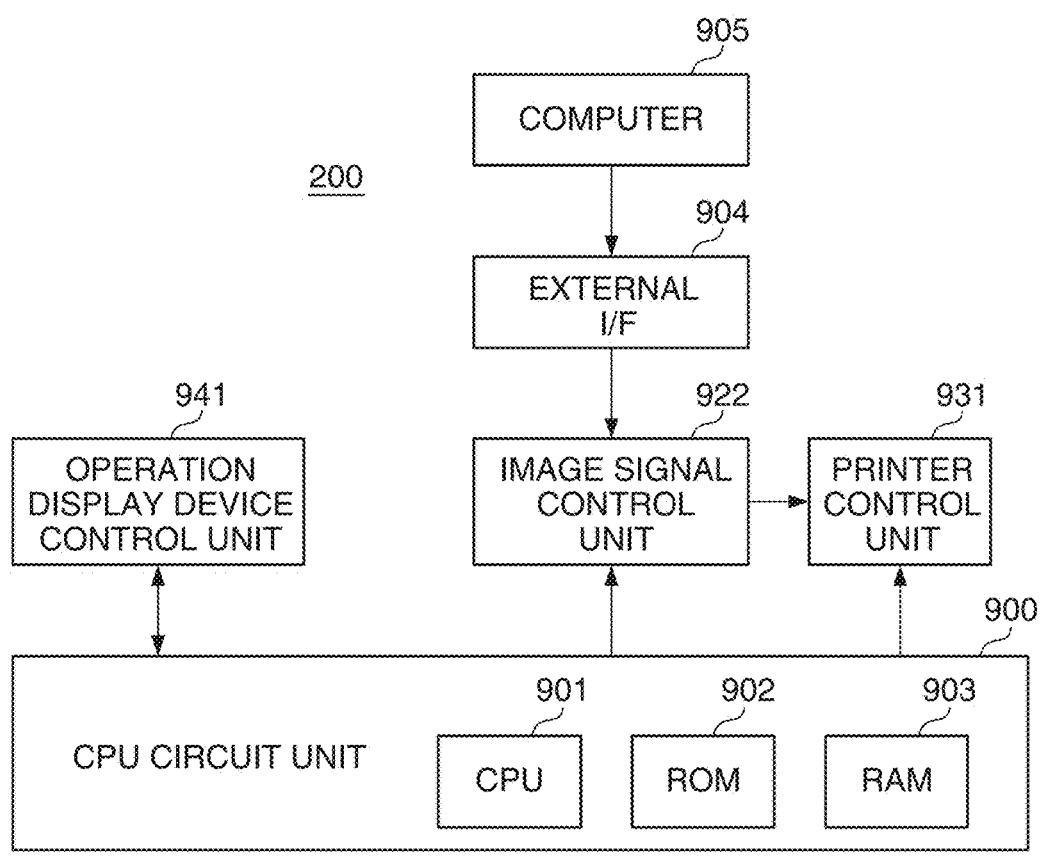
FIG. 2 is a block diagram showing a controller.

Referring next to FIG. 2, a description will be given of an arrangement of a controller 200 which is responsible for controlling the entire image forming apparatus 100. FIG. 2 is a block diagram showing the controller 200. The controller 200 has a CPU circuit unit 900, which has a CPU 901, a ROM 902, and a RAM 903 incorporated therein. The CPU circuit unit 900 centrally controls an image signal control unit 922, a printer control unit 931, and an operation display device control unit 941 in accordance with control programs stored in the ROM 902. The RAM 903 is used to temporarily hold control data and also used as a work area for computation processes associated with control.

The image signal control unit 922 performs various types of processing on a digital image signal input from a computer 905 via an external I/F 904, converts the digital image signal into a video signal, and outputs the video signal to the printer control unit 931. Processes performed by the image signal control unit 922 are controlled by the CPU circuit unit 900. The printer control unit 931 drives the exposure device 13 (FIG. 1) based on the input video signal. The CPU 901 forms images and performs a variety of adjustment operations, to be described later, through the printer control unit 931.

The operation display device control unit 941 exchanges information with the operation display device 400 (FIG. 1) and the CPU circuit unit 900. The operation display device 400 has a plurality of keys for setting a variety of functions relating to formation of images, a display unit for displaying information on setting statuses, and so forth, and outputs key signals corresponding to respective key operations to the CPU circuit unit 900. Based on a signal output from the CPU circuit unit 900, the operation display device 400 displays corresponding information on the display unit.

Figure 3:
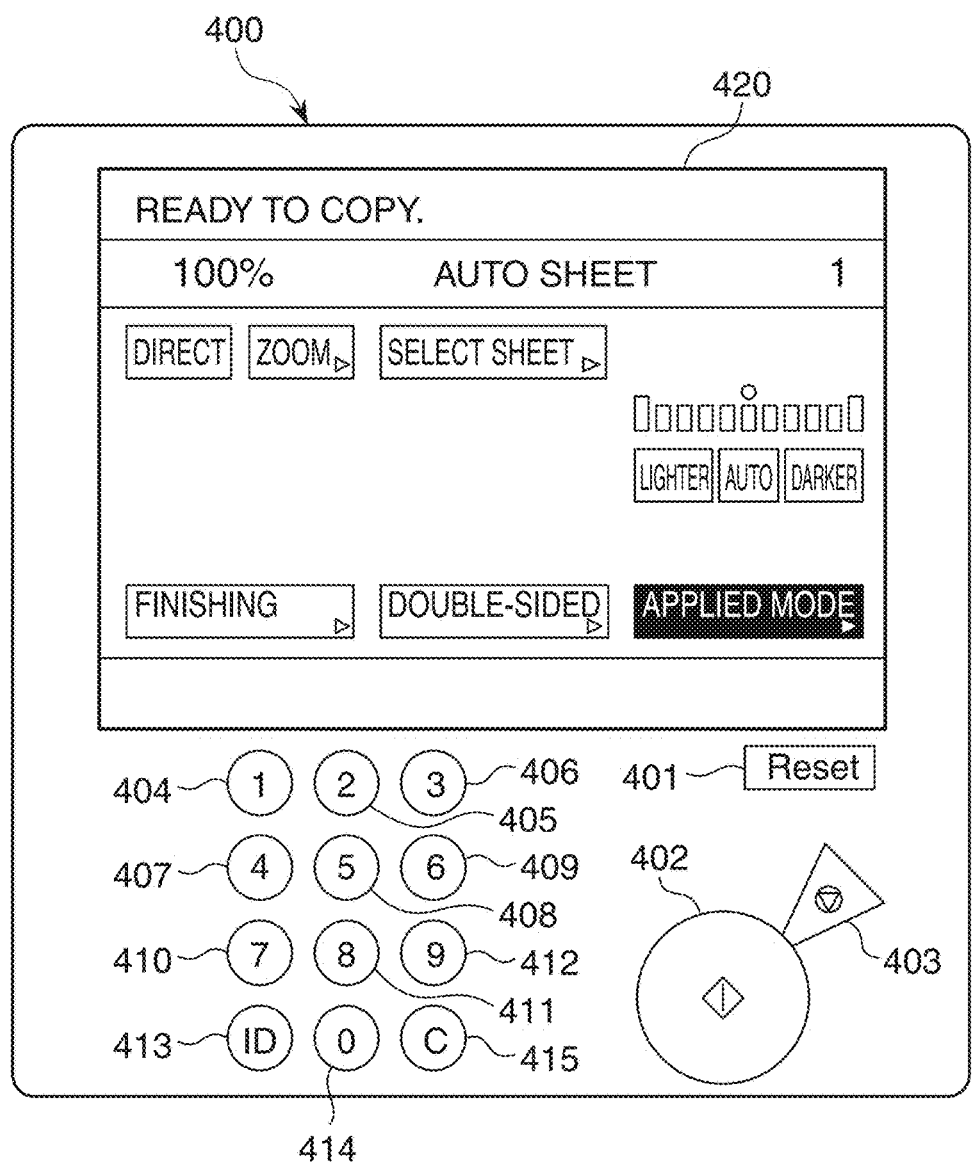
FIG. 3 is a view showing an operation display device.

FIG. 3 is a view showing the operation display device 400. The operation display device 400 has a display unit 420. The display unit 420 has a touch panel at the top thereof so that software keys can be created on a screen. The operation display device 400 has a numeric keypad comprised of keys 404 to 414, a clear key 415, a start key 402, a stop key 403, a reset key 401, and so forth.

The image forming apparatus 100 has a weekly timer function. This function enables a user to set a weekly timer time (scheduled shift time), at which use of the image forming apparatus 100 is stopped, in advance so that the image forming apparatus 100 can automatically shift into a sleep state when it is the set weekly timer time even if the user forgot about turning off the power.

Figure 4:
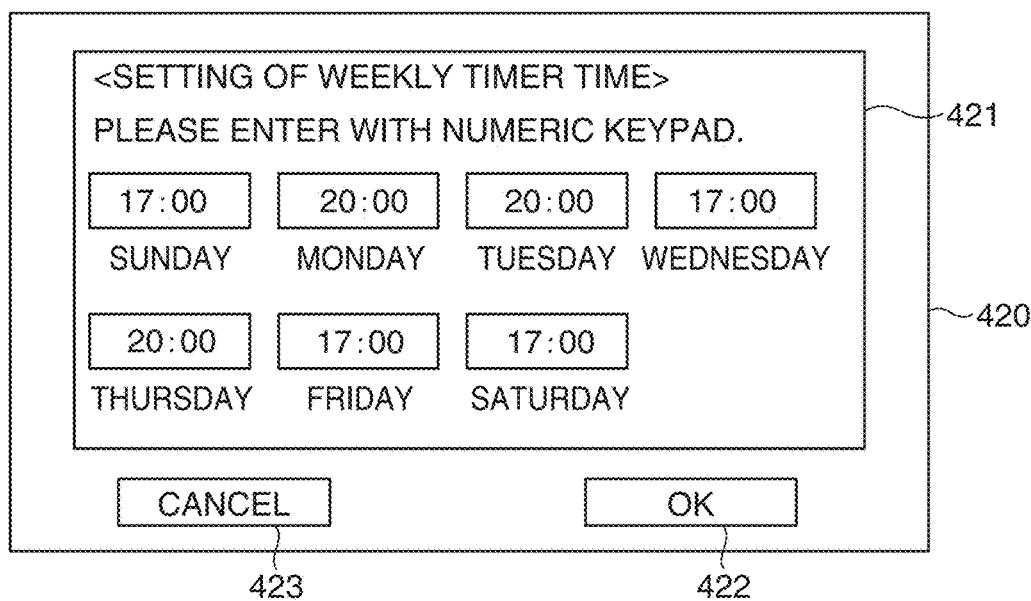
FIG. 4 is a view showing an exemplary time setting screen.

FIG. 4 is a view showing an exemplary time setting screen 421. The time setting screen 421 is displayed on the display unit 420 of the operation display device 400 when the user inputs a predetermined instruction. On the time setting screen 421, for example, the user is allowed to enter a time at which the image forming apparatus 100 shifts into a sleep mode on each day from Sunday to Saturday. When a time is entered, and an OK key 422 is depressed, the weekly timer time is confirmed, and a value thereof is stored in a nonvolatile memory (not shown) inside the CPU circuit unit 900. The operation display device 400 acts as a setting unit of the present invention.

By depressing a cancel key 423, the user is allowed to reenter a time at which the image forming apparatus 100 shifts into the sleep mode. The CPU 901 has a timing device to constantly measure a current time. The CPU 901 compares the weekly timer time and the current time with each other, and when the current time matches the weekly timer time, the CUP 901 brings the image forming apparatus 100 into the sleep mode. It should be noted that although in FIG. 4, the sleep mode is taken as an example of states into which the image forming apparatus 100 shifts, this is not limitative, but a time at which the image forming apparatus 100 is scheduled to shift into any other power-saving state may be set. Alternatively, a time at which the power to the image forming apparatus 100 is turned off may be set.

The image forming apparatus 100 according to the present embodiment is able to carry out multiple types of adjustment operations to adjust the image forming units 1. Examples of the adjustment operations include "potential control" and a "charging device cleaning operation (hereafter referred to as wire cleaning)". Besides, there is, for example, "color registration control" in which misregistration of yellow, magenta, cyan, and black colors is corrected for. These various types of adjustment operations are generally carried out according to the number of pages on which images have been formed (the number of sheets with images formed thereon). As for the potential control and the color registration control, results vary with environmental changes such as temperature and humidity changes. Namely, these adjustment operations affect printing characteristics varying with environmental changes (hereafter referred to as environment affected adjustment operations). It is thus preferred that these adjustment operations are carried out again immediately before an image forming operation when the image forming apparatus 100 has been unused for a long period of time or when a cover of the image forming apparatus 100 is opened or closed even if no image is formed after the adjustment operations are performed. On the other hand, the wire cleaning is an adjustment operation that does not affect printing characteristics varying with environmental changes (hereafter referred to as an environment non-affected adjustment operation). Thus, the wire cleaning does not need to be performed in response to the image forming apparatus 100 having been unused for a long period of time or opening or closing of the cover.

FIG. 5 is a view showing an exemplary scheduled operation time table 501. The scheduled operation time table 501 is stored in the ROM 902 or the RAM 903 in advance, and with respect to each type of adjustment operations, defines a scheduled time for an adjustment operations by the number of sheets with images formed thereon. In FIG. 5, two types of adjustment operations are given as examples. Types of adjustment operations are identified by ID(n), and n is a variable. The number of sheets with images formed thereon (threshold value Xn) is set for each type of adjustment operations. For example, 2500 and 5000 are set as the threshold values Xn for the wire cleaning and the potential control, respectively.

Scheduled operations times for respective adjustment operations are determined with reference to the scheduled operation time table 501. For example, the wire cleaning and the potential control are scheduled to be performed when the number of sheets on which images have been formed since a last adjustment operation was performed has reached 2500 and 5000, respectively. It should be noted that as for the color registration control as well, a unique threshold value may be set in the scheduled operation time table 501. It should be noted that the threshold values Xn are set for respective types of adjustment operations but may be the same value. Moreover, contents of the scheduled operation time table 501 may be configured to be changed later by the user. In the scheduled operation time table 501, the threshold value Xn for at least one type of adjustment operation has only to be set.

A brief description will now be given of each adjustment operation. The charging wire 12 becomes dirty because toner, external additives, paper powders, and so forth flying out of the developing device 14 and others are attached to it, and as a result, charging performance of the charging wire 12 deteriorates. For this reason, formation of images needs to be suspended so as to perform cleaning. The charging wire 12 has a wire cleaning member (not shown), which cleans the charging wire 12 by moving forward and backward alternately in a longitudinal direction.

On the other hand, the potential control is to perform what is called image density correction. Namely, in the potential control, predetermined measurement images are formed on the photosensitive drums 11 while laser power of the exposure device 13 is changed and optimum laser power levels of the exposure device 13 are calculated based on measured potentials in areas where the measurement images are formed. The potential control will be further described with reference to FIGS. 6 and 7.

Figure 6:
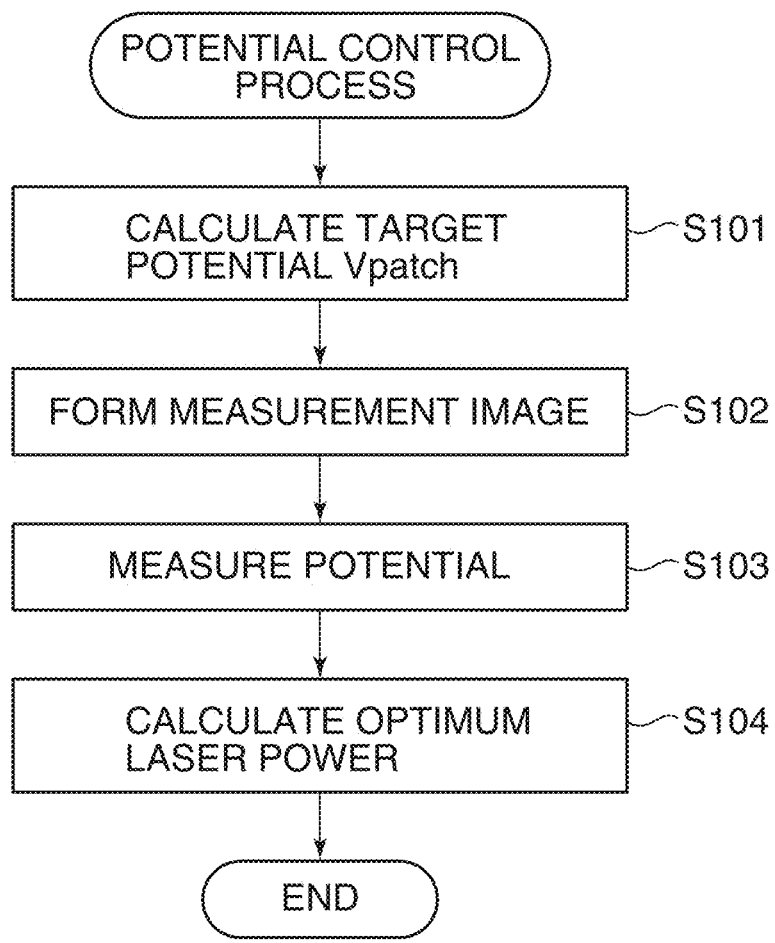
FIG. 6 is a flowchart showing a potential control process.

FIG. 6 is a flowchart showing a potential control process. The process in this flowchart is carried out by the CPU 901 reading out and executing a program stored in the ROM 902. This process could be an adjustment operation which is carried out in step S208 in FIG. 8 and steps S503 and S505 in FIG. 11, to be described later. First, based on an input from an environmental sensor (not shown), the CPU 901 calculates target potentials Vpatch from moisture contents and temperatures of the developing devices 14 (step S101). Next, the CPU 901 forms measurement images on the photosensitive drums 11 while changing laser power of the exposure device 13 (step S102). The measurement images are formed in the respective colors.

Figure 7:
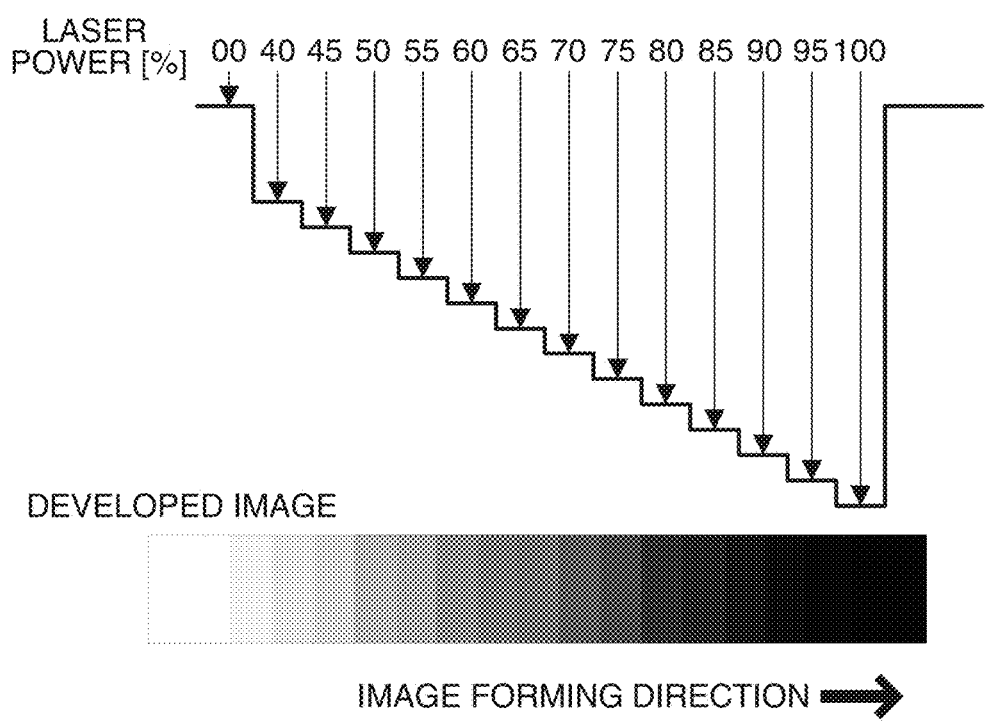
FIG. 7 is a view showing a relationship between laser power and developed images in laser power control.

FIG. 7 is a view showing a relationship between laser power and developed images in laser power control. The measurement images have a shape of a rectangle with long sides thereof extending in an image forming direction. Since laser power (%) is gradually changed while the measurement images are being formed, the developed images has densities varying in steps in the image forming direction. Then, the CPU 901 controls the detecting sensors 201Y, 201M, 201C, and 201K for the respective colors to measure potentials in respective laser power levels (step S103). Based on the measured potentials, the CPU 901 calculates optimum laser power so that potentials of images to be formed can be equal to the target potentials Vpatch (step S104), and ends the process in FIG. 6.

Figure 8:
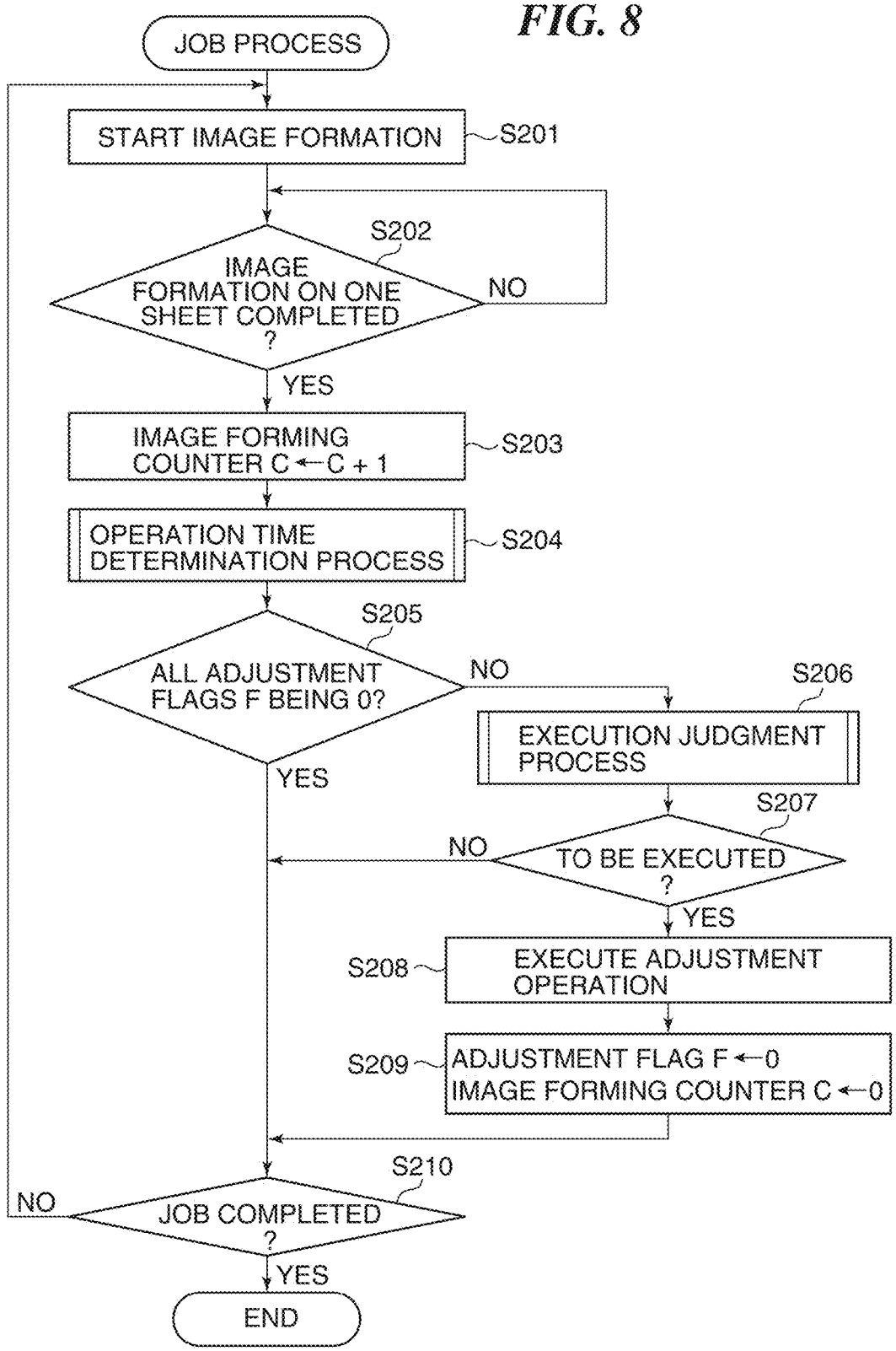
FIG. 8 is a flowchart showing a job process.

Referring next to FIGS. 5 and 8 to 10, a description will be given of how the adjustment operations are controlled while an image is being formed. FIG. 8 is a flowchart showing a job process. The process in this flowchart is carried out by the CPU 901 reading out and executing a program stored in the ROM 902. This process is started when a print job is submitted.

First, the CPU 901 starts image formation (step S201) and stands by until image formation on a current sheet in the job is completed (step S202), and when the image formation on the sheet is completed, the process proceeds to step S203. In the step S203, the CPU 901 increments image formation counters C, which are variables stored in the RAM 903, by 1 to update the image formation counters C. It should be noted that the image formation counters C corresponding in number to the types of adjustment operations are prepared, and here, all the image formation counters C are updated. For example, a counter C1 is for the wire cleaning, and a counter C2 is for the potential control. It should be noted that a value to be added is 1 irrespective of sizes of sheets with images formed thereon, but may be varied with the sizes. For example, a value to be added may be 1 for an A4 size, 2 for an A3 size, and 3 for an A3+ size.

Figure 9:
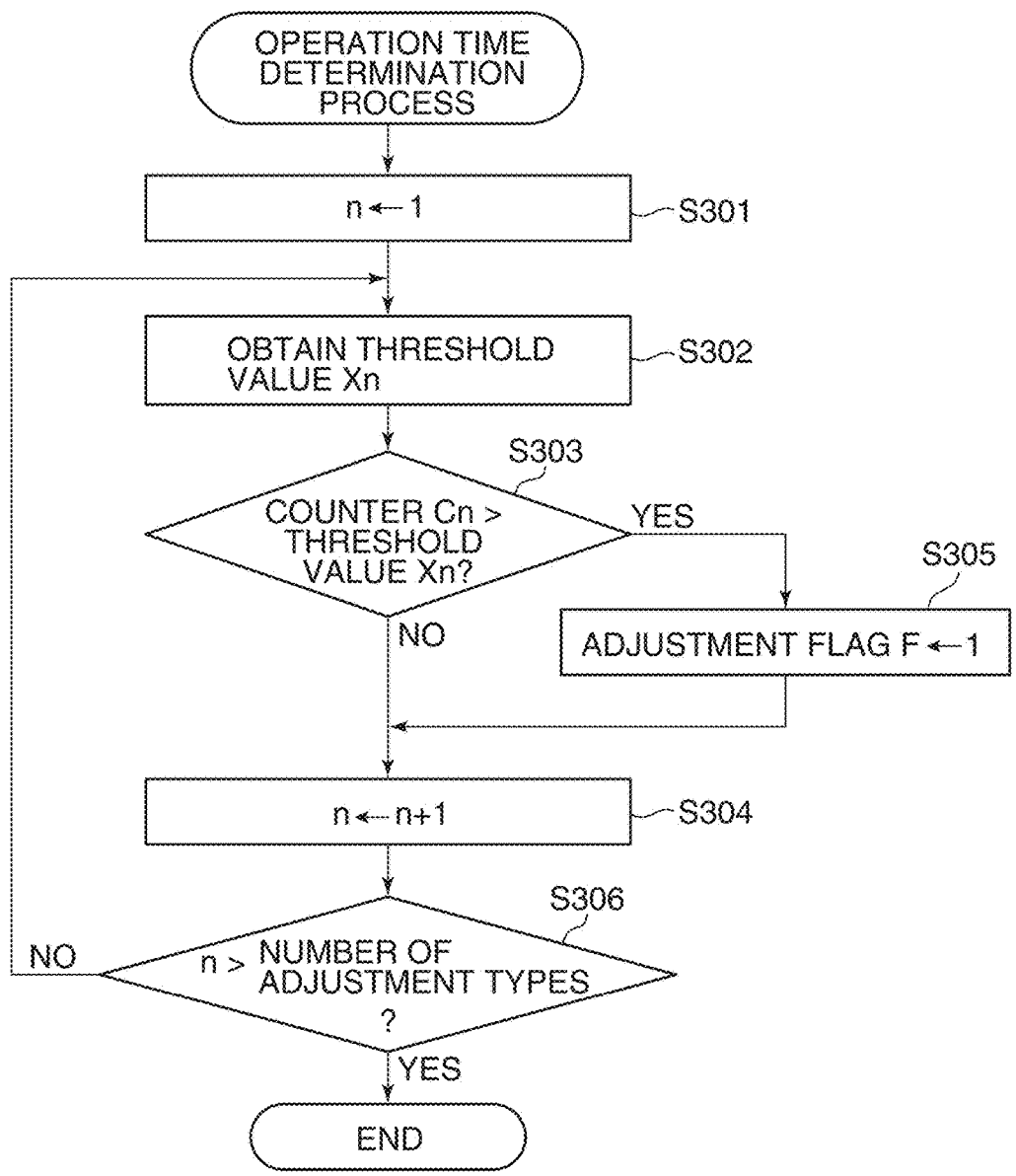
FIG. 9 is a flowchart showing a operation time determination process.

Next, in step S204, the CPU 901 carries out an operation time determination process (FIG. 9), to be described later. FIG. 9 is a flowchart showing the operation time determination process. First, in step S301, the CPU 901 assigns 1 to a variable n provided on the RAM 903. The variable n defines a type of an adjustment operation that is a target of judgment this time. In step S302, the CPU 901 refers to the scheduled operation time table 501 (FIG. 5) and obtains a threshold value Xn for the variable n. For example, when n=1, a threshold value Xn=2500 (sheets) is obtained.

Next, in step S303, the CPU 901 compares the obtained threshold value Xn and an image forming counter Cn (one of the image forming counters C which is associated with the target of judgment this time) with each other and determines whether or not Cn>Xn holds. As a result, whether or not it is a scheduled operation time. When Cn>Xn holds, it is determined that it is the scheduled operation time for the adjustment operation, which is the target of judgment, because the number of sheets on images have been printed since a previous adjustment operation was carried out has become greater than the threshold value Xn. Thus, the CPU 901 sets an adjustment flag Fn, which is associated with the adjustment operation that is the target of judgment this time among adjustment flags F for respective types of adjustment operations, to "1" (step S305). The process then proceeds to step S304. On the other hand, when Cn ≤Xn holds, the process proceeds to the step S304 because it is not the scheduled operation time.

In the step S304, the CPU 901 updates the variable n by incrementing it. Then, the CPU 901 determines whether or not the variable n has become greater than the number of types of adjustment operations (step S306), and when the variable n has not become greater than the number of types of adjustment operations, the process returns to the step S302, in which the CPU 901 in turn makes, for example, a determination as to an adjustment operation that is a target of judgment next time. On the other hand, when the variable n has become greater than the number of types of adjustment operations, the CPU 901 ends the process in FIG. 9 because the determinations as to all the adjustment operations have been completed.

In step S205 in FIG. 8, the CPU 901 determines whether or not all of multiple adjustment flags F are "0". When all of the adjustment flags F are "0", the process proceeds to step S210 because there is no adjustment operation for which it is the scheduled operation time. In the step S210, the CPU 901 determines whether or not processing of the job has completed, and when processing of the job has not completed, the process returns to the step S201. On the other hand, when processing of the job has completed, the CPU 901 ends the process in FIG. 8.

Figure 10:
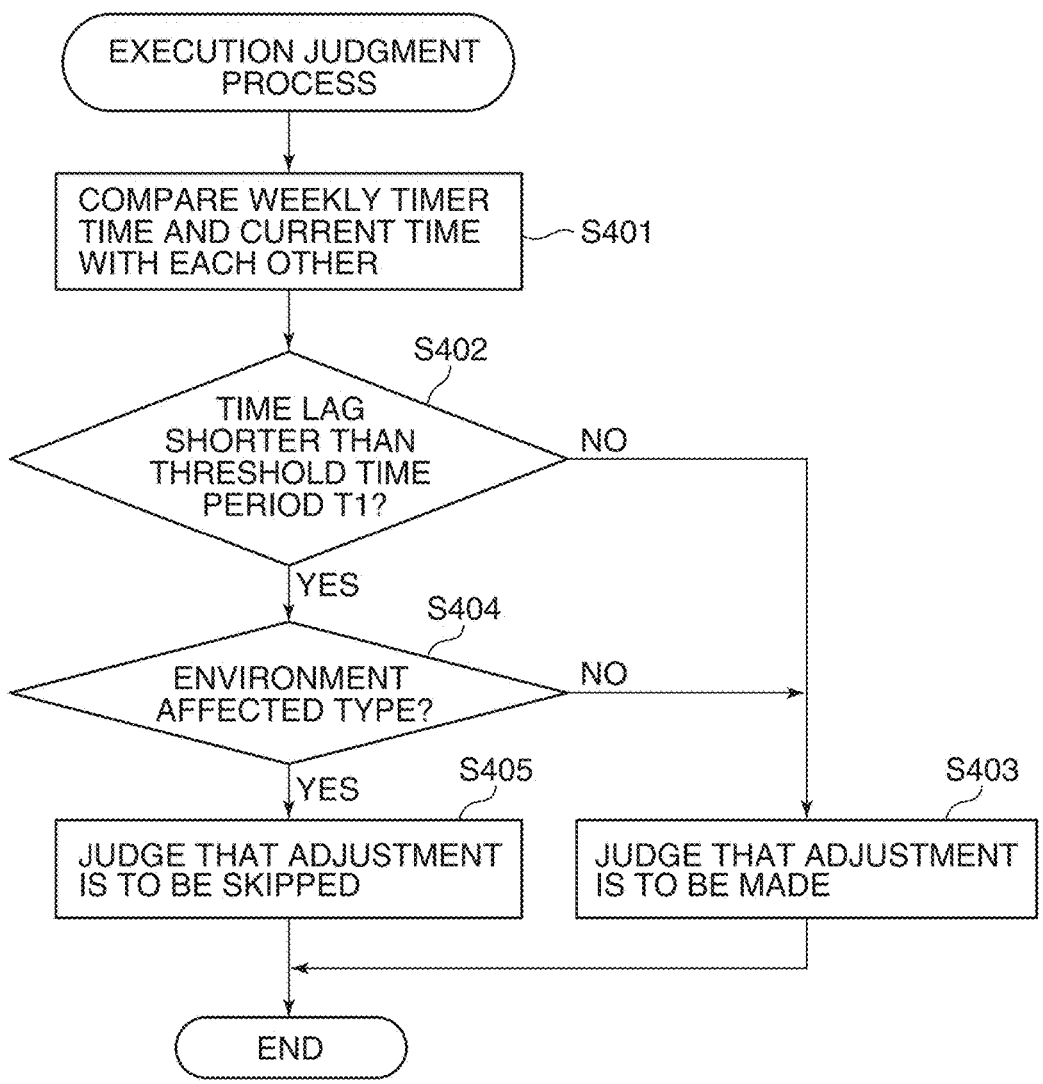
FIG. 10 is a flowchart showing an execution judgment process.

As a result of the determination in the step S205, when any of the multiple adjustment flags F is "1", the CPU 901 carries out an execution judgment process (FIG. 10) in step S206. FIG. 10 is a flowchart showing the execution judgment process. This process is carried out for each of adjustment operations with adjustment flags F="1".

First, the CPU 901 compares the weekly timer time and the current time with each other (step S401). Next, the CPU 901 determines whether or not a remaining time period which is a time lag between the current time and the weekly timer time is less than a first threshold time period T1 (i.e. shorter than a threshold time period) (step S402). A value of the first threshold time period T1 is, for example, five minutes although this is not limitative. A user or a serviceperson may change the value of the first threshold time period at a later time. When the remaining time period is not less than the first threshold time period T1, shifting into the sleep mode does not immediately occur, and hence an adjustment operation should be properly performed as scheduled. Thus, for an adjustment operation that is an object of judgment this time, the CPU 901 judges that "adjustment is to be made" (step S403) and ends the process in FIG. 10.

On the other hand, when the remaining time period is less than the first threshold time period T1, shifting into the sleep mode immediately occurs even if the adjustment operation is performed this time, and therefore, the adjustment operation is likely to be performed again return from the sleep mode occurs so as to form a next image. In this case, necessity to perform an environment affected adjustment operation in particular is small this time, and from the viewpoint of reducing wasteful consumption of toner, it is considered preferable to put the adjustment operation on hold this time. Accordingly, the CPU 901 determines whether or not the adjustment operation that is the target of judgment this time is an environment affected adjustment operation (step S404).

When the adjustment operation that is the target of judgment this time is an environment affected adjustment operation, the CPU 901 judges that "adjustment is to be skipped" for the adjustment operation that is the target of judgment this time (step S405). Skipping adjustment means that the adjustment operation is put on hold this time. For example, for the potential control, it is judged that adjustment is to be skipped. After that, the CPU 901 ends the process in FIG. 10. On the other hand, as a result of the judgment in the step S404, when the adjustment operation that is the target of judgment this time is not an environment affected adjustment operation (in other words, the adjustment operation that is the target of judgment this time is an environment non-affected adjustment operation), the CPU 901 judges that "adjustment is to be made" for this adjustment operation (step S403). For example, for the wire cleaning, it is judged that adjustment is to be made.

It should be noted that under normal circumstances, the adjustment operation for which it has been judged that adjustment is to be skipped is not carried out even when it is a scheduled operation time. However, the threshold values Xn in the scheduled operation time table 501 (FIG. 5) are generally determined with usage under the worst environmental conditions in mind and have margins for environments of usage likely to be ordinary offices. Therefore, as long as the first threshold time period T1 is set to an appropriate time period that is not too long (for example, five minutes), a delayed adjustment operation hardly affects printing quality. After that, the CPU 901 ends the process in FIG. 10.

In step S207 in FIG. 8, the CPU 901 causes the process to branch according to a result of the judgment in the step S206 with respect to each adjustment operation. Namely, when the CPU 901 judges that adjustment is to be skipped, the process proceeds to step S210, and on the other hand, when the CPU 901 judges that adjustment is to be made, it performs all adjustment operations for which it has been judged that adjustment is to be made (step S208), followed by the process proceeding to step S209. In the step S209, the CPU 901 clears the adjustment flags F and the image forming counters C concerned with the performed adjustment operations, followed by the process proceeding to the step S210.

Figure 11:
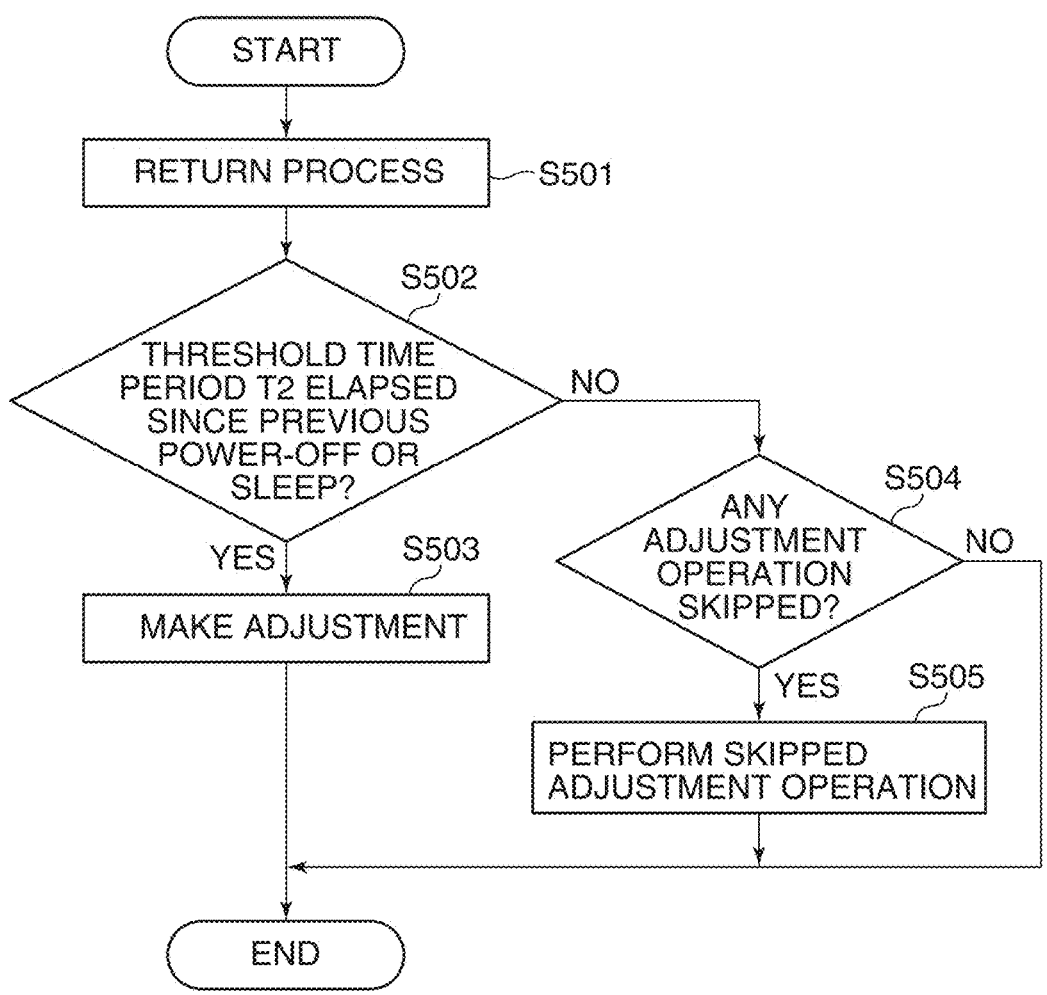
FIG. 11 is a flowchart showing an adjustment operation executing process.

A description will now be given of how an adjustment operation is controlled when the image forming apparatus 100 returns from the sleep state or a power-off state. FIG. 11 is a flowchart showing an adjustment operation executing process. The process in this flowchart is carried out by the CPU 901 reading out and executing a program stored in the ROM 902. This process is started when there is a returning factor such as an instruction to return from the power-saving state or the power-off state.

First, in step S501, the CPU 901 carries out a process in which it returns the image forming apparatus 100 from the power-off state to a power-on state or from the sleep mode to a standby mode in accordance with a returning factor. Next, in step S502, the CPU 901 determines whether or not a second threshold time period T2 has elapsed since the last power-off or shifting into the sleep state. When a time period that has elapsed since the last power-off or shifting into the sleep state is longer than the second threshold time period T2, the CPU 901 performs all environment affecting adjustment operations (step S503). After that, the process in FIG. 11 is brought to an end.

On the other hand, when the CPU 901 determines in the step S502 that a time period that has elapsed since the last power-off or shifting into the sleep state is not longer than the second threshold time period T2, the process proceeds to step S504. In the step S504, the CPU 901 determines whether or not there is any adjustment operation for which it was judged that adjustment was to be skipped and execution of which was put on hold. When there is any adjustment operation put on hold, the CPU 901 performs the adjustment operation put on hold (skipped) (step S505) and ends the process in FIG. 11. On the other hand, when there is no adjustment operation put on hold, the CPU 901 ends the process in FIG. 11.

As described above, wasteful consumption of toner is reduced because an environment affected adjustment operation is not performed immediately before a time at which use of the image forming apparatus 100 is stopped, but is performed immediately before use of the image forming apparatus 100 is started.

According to the present embodiment, when it is a time at which an adjustment operation is scheduled to be performed upon counting-up of the number of sheets with images formed thereon, whether or not to perform the adjustment operation is controlled based on a remaining time before the weekly timer time (scheduled shift time). Specifically, the CPU 901 puts (skips) the adjustment operation on hold when the remaining time period is shorter than the first threshold time period T1, and when the remaining time period is not shorter than the first threshold time period T1, the CPU 901 provides control to perform the adjustment operation. Since the adjustment operation immediately before the image forming apparatus 100 shifts into a state of being not in use is thus put on hold, wasteful consumption of toner is reduced. Also, when there is a long time period remaining before the image forming apparatus 100 shifts into a state of being not in use, the adjustment operation is performed to reliably form images in an appropriate manner.

Moreover, since the environment non-affected adjustment operation is performed as scheduled even when the remaining time period is shorter than the first threshold time period T1 (S404→S403), appropriate image formation is reliably performed. It should be noted that in the steps S404 and S405 in FIG. 10, only an environment affected adjustment operation is targeted for the judgment that adjustment is to be skipped, but for an environment non-affected adjustment operation as well, it may be judged that adjustment is to be skipped as long as the remaining time period is shorter than the first threshold time period T1. In that case, the step S404 should be dispensed with.

An environment affected adjustment operation is performed when a time period that has elapsed since the last power-off or shifting into the sleep state is longer than the second threshold time period T2 at the time of return from the power-off or sleep state. This prevents characteristics from changing as time passes. It should be noted that in the step S503 in FIG. 11, the environment non-affected adjustment operation as well may be executed. In that case, all adjustment operations are performed as long as a time period that has elapsed since the last power-off or shifting into the sleep state is longer than the second threshold time period T2 at the time of return from the power-off or sleep state irrespective of whether or not those adjustment operations have been put on hold.

The CPU 901 prohibits execution of the environment affected adjustment operation since a time prior by a predetermined period to the time at which the image forming apparatus 100 shifts automatically into the power-off state. In the same way, the CPU 901 prohibits execution of the environment affected adjustment operation since the time prior by a predetermined period to the time at which the image forming apparatus 100 shifts automatically into the sleep state. As a result, according to the present embodiment, it is possible to suppress increment of a downtime due to wasteful execution of the environment affected adjustment operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-084412, filed Apr. 20, 2016, which is hereby incorporated by reference herein in its entirety.

What is claimed is:

1. An image forming apparatus that is controlled based on a first mode and a second mode in which power consumption is lower than that of the first mode and is shifted from the first mode to the second mode according to a designated time, comprising:
   an image forming unit configured to form an image on a sheet;
   a controller configured to control the image forming unit to execute an adjustment process; and
   a setting unit configured to set the designated time;
   wherein, the controller controls whether to execute the adjustment process based on the number of sheets on which the images are formed by the image forming unit, the adjustment process includes a first adjustment operation and a second adjustment operation, the controller executes the first adjustment operation in a case where the number of sheets on which the images are formed by the image forming unit has reached a first number since a previous first adjustment operation was executed last time, the controller executes the second adjustment operation in a case where the number of sheets on which the images are formed by the image forming unit has reached a second number since a previous second adjustment operation was executed last time, the controller executes the first adjustment operation in a case where the number of sheets has reached the first number prior to the designated time by a predetermined period, and the controller skips the second adjustment operation in a case where the number of sheets has reached the second number prior to the designated time by the predetermined period;

the image forming apparatus further comprising a sensor configured to measure a measurement image formed by the image forming unit, wherein the image forming unit comprises a photosensitive member, a charging unit which charges the photosensitive member with electricity, an exposure unit which exposes the photosensitive member charged by the charging unit to light in order to form an electrostatic latent image, and a developing unit which develops the electrostatic latent image on the photosensitive member, the charging unit comprises a cleaner which cleans the charging unit, in the first adjustment process, the controller controls the cleaner to clean the charging unit, and in the second adjustment process, the controller causes the image forming unit to form the measurement image, causes the sensor to measure the measurement image, and adjusts image forming conditions for the image formation unit based on a measurement result of the measurement image.

2. The image forming apparatus according to claim 1, wherein the second number is different from the first number.

3. The image forming apparatus according to claim 1, wherein the sensor measures a measurement electrostatic latent image for detecting a surface potential of the photosensitive member.

4. The image forming apparatus according to claim 1, wherein the image forming unit includes a plurality of image forming sections which forms images of different colors, respectively, the sensor measures a measurement image formed by the image forming unit in order to detect an amount of color misregistration of the images of the different colors, and in the second adjustment process, the controller corrects a relative misregistration of the images of the different colors formed by the image forming unit based on the amount of color misregistration.

5. The image forming apparatus according to claim 1, wherein the controller controls whether to execute the second adjustment process after the image forming apparatus is shifted from the second mode to the first mode, and the controller executes the second adjustment process in a case where a time period during which the image forming apparatus has been shifted to the second mode is longer than a predetermined time period.

6. The image forming apparatus according to claim 5, wherein in a case where the time period is equal to or shorter than the predetermined time period, the controller determines whether the previous second adjustment process was skipped last time, and in a case where the previous second adjustment process was skipped, the controller controls the image forming unit to execute the second adjustment process.

7. An image forming apparatus comprising:

an image forming unit configured to form an image on an image carrier;

a transfer unit configured to transfer the image formed on the image carrier to a sheet;

a sensor configured to measure a measurement image formed on the image carrier; and a processor configured to:

shift a mode of the image forming apparatus from a first mode to a second mode in which power consumption is lower than that of the first mode at a preset set time;

control whether to execute a adjustment process in a first period based on the number of executions of image formation;

in a case where the adjustment process is executed, control the image forming unit to form the measurement image, control the sensor to measure the measurement image, and adjust image forming conditions for the image forming unit based on a measurement result of the measurement image;

in a case where a plurality of images to be transferred onto a plurality of sheets are formed by the image forming unit in a second period which is a period from a predetermined time before the preset set time to the preset set time, skip the adjustment process, the first period being different from the second period; and in a case where the adjustment process is skipped in the second period, execute the adjustment process after the mode of the image forming apparatus is shifted from the second mode to the first mode.

8. The image forming apparatus according to claim 7, wherein the processor executes the adjustment process in a case where the number of executions of image formation after previous execution of the adjustment process in the first period has reached a predetermined number.

9. The image forming apparatus according to claim 7, wherein the processor further executes a cleaning process for cleaning the image forming unit based on the number of executions of image formation.

10. The image forming apparatus according to claim 7, wherein the processor further executes a cleaning process for cleaning the image forming unit based on the number of executions of image formation, the processor executes the adjustment process in a case where the number of executions of image formation after previous execution of the adjustment process in the first period has reached a first number, and the processor executes the cleaning process in a case where the number of executions of image formation after previous execution of the cleaning process has reached a second number.

11. The image forming apparatus according to claim 7, wherein the image forming unit comprises a charging unit which charges the image carrier with electricity, an exposure unit which exposes the charged image carrier to light in order to form an electrostatic latent image, and a developing unit which develops the electrostatic latent image on the image carrier, and the processor further executes a cleaning process for cleaning the charging unit based on the number of executions of image formation.

12. The image forming apparatus according to claim 7, wherein the image forming unit comprises a charging unit which charges the image carrier with electricity, an exposure unit which exposes the charged image carrier to light in order to form an electrostatic latent image, and a developing unit which develops the electrostatic latent image on the image carrier, the processor further executes a cleaning process for cleaning the charging unit based on the number of executions of image formation, the processor executes the adjustment process in a case where the number of executions of image formation after previous execution of the adjustment process in the first period has reached a first number, and the processor executes the cleaning process in a case where the number of executions of image formation after previous execution of the cleaning process has reached a second number.

13. The image forming apparatus according to claim 7, wherein in a case where the number of executions of image formation has reached a predetermined number while a plurality of images to be transferred to a plurality of sheets are formed by the image forming unit in the first period, the processor causes the image forming unit to form the measurement image between a first image and a second image among the plurality of images, and the second image is adjacent to the first image before formation of the measurement image.

14. The image forming apparatus according to claim 9, wherein in a case where the number of executions of image formation has reached a predetermined number while a plurality of images to be transferred to a plurality of sheets are formed by the image forming unit, the processor executes the cleaning process between formation of a first image and that of a second image among the plurality of images.

15. The image forming apparatus according to claim 7, wherein the processor determines whether or not to execute the adjustment processing, in a case where a current time is within the first period, the processor controls whether to execute the adjustment process based on the determination result, and in a case where the current time is within the second period, the processor skips the adjustment process regardless of the determination result.

16. The image forming apparatus according to claim 7, wherein the image forming unit includes a plurality of stations that form respective images of different colors, the measurement image is used for detecting misregistration, and the processor adjusts the image forming conditions based on the detected misregistration.

17. The image forming apparatus according to claim 7, wherein the processor changes the preset set time based on information input from the operation device.

\* \* \* \* \*